United States Patent [19]

Pifferi

[11] 4,156,077
[45] May 22, 1979

[54] PROCESS FOR OBTAINING A DYE SUBSTANCE OF VEGETAL ORIGIN

[76] Inventor: Pier G. Pifferi, Via Ortolani, 3, Bologna, Italy

[21] Appl. No.: 737,768

[22] Filed: Nov. 1, 1976

[30] Foreign Application Priority Data

Nov. 12, 1975 [IT] Italy ................................. 3583A/75

[51] Int. Cl.$^2$ ........................ C09B 61/00; C07H 15/04
[52] U.S. Cl. ............................................. 536/4; 8/53;
8/80; 426/429; 426/431; 426/489; 195/7; 536/1
[58] Field of Search ............... 8/80, 53; 426/425, 431,
426/429, 489, 254, 257; 260/236.5; 536/4

[56] References Cited

U.S. PATENT DOCUMENTS 3,963,700  6/1976  Philip ................................. 260/236.5

FOREIGN PATENT DOCUMENTS 276291  6/1967  U.S.S.R. ......................................... 8/80

OTHER PUBLICATIONS

Brummett, B. *Pigment & Chromogen Characteristics of Sunflower Seed, Helianthus annus*, University Microfilms, Ann Arbor.

*Primary Examiner*—Donald E. Czaja
*Assistant Examiner*—Maria S. Tungol
*Attorney, Agent, or Firm*—Guido Modiano; Albert Josif

[57] ABSTRACT

A method of producing anthocyanin, comprising the steps of treating sunflower seed husks containing anthocyanin at ambient temperature and in a non-oxidizing atmosphere with an acid solution selected from a group consisting of water and an organic or inorganic acid, organic solvent and an organic or inorganic acid, organic solvent and aqueous solution of an organic or inorganic acid, and pure liquid organic acid, then filtering the resulting solution and concentrating the filtrate under vacuum at a temperature between 35° C. to 40° C., to obtain a red colored liquid substance.

9 Claims, No Drawings

PROCESS FOR OBTAINING A DYE SUBSTANCE OF VEGETAL ORIGIN

BACKGROUND OF THE INVENTION

This invention relates to an industrial process for obtaining, a rich pigmentation dye substance of vegetal origin specially suitable owing to its vegetal origin, for use in food products, cosmetics, and the like.

As is known, the present trend in the food dyeing field is one of progressively replacing, wherever possible and consistently with the food technology own requirements, the food dyes obtained by chemical synthesis from tar derivatives with natural pigments of vegetal origin. This, obviously, both on account of the potential hazard inherent to the synthetic dyes owing to their structures (either azo - compounds or aromatic compounds of triphenylmethane containing sulphonic or carboxylic groups) and of the seldom adequately documented proof of their total harmlessness for the human organism. Hence, the convenience, and even the necessity, of finding new sources wherefrom natural pigments may be extracted in the future, in consistent amounts and at the lowest possible cost.

SUMMARY OF THE INVENTION

Therefore, it is a primary object of this invention to provide an industrial process or method of producing a rich pigmentation vegetal dye, particularly of ruby red color, intended for the dyeing of foodstuff, cosmetics, medicaments, and the like.

It is another object of the invention to provide a liquid dye, specially suitable for fixing into finely milled organic or inorganic substances in order to obtain powders which are dyed in different colors.

These and other objects, such as will be apparent hereinafter, are in practice advantageously achieved by a method of producing a red colored vegetal dyeing substance belonging to the same chemical class as the anthocyanins characterized in that it comprises the steps of treating black-pigmented sunflower seed huskers with an acid solution, acidified with an agent selected from a group comprising mineral acids, organic acids, aqueous solutions of organic acids, and aqueous solutions of inorganic acids, at ambient temperature and in a non-oxidizing atmosphere, of subjecting the resulting solution to filtration followed by concentration under vacuum to a small volume and at a temperature between 35° C. to 40° C., such as to obtain a richly colored liquid substance.

DESCRIPTION OF THE PREFERRED EMBODIMENTS

This invention originates from research work carried out on natural pigments of vegetal origin, and more particularly on the black pigmenting substance which tinges the achenes of sunflower (Helianthus annuus). It has been ascertained that the black of the tegument of some sunflower seeds of a heretofore unknown variety, accidentally present in grain samples, on being treated with particular organic solvents, would pass into solution as a ruby red dye. It has been also ascertained, from subsequently carried out tests, that this red dyeing substance (helianthocyanine) could only be traced in very few varieties among the approximately 150 varieties examined, although all such varieties had their achenes pigmented black or black with a just perceptible dark red shade. It has also been ascertained that this dyeing substance belongs, from the standpoint of its chemical structure, to the class of the anthocyanins.

The most effective alcohols, relative to the instant method, are in a decreasing order, methyl, ethyl, isopropyl, propyl, butyl, isobutyl, and amyl alcohols.

The most suitable polyalcohols are ethylene and propylene glycoles, glycerine, and liquid sorbitol. The most suitable polyalcohol ether is monomethyletherethyleneglycol: among the pure organic acids, lactic acid and formic acid proved satisfactory. The most suitable mineral acids are hydrochloric acid, sulphuric acid, phosphoric acid, sulphurous acid and carbonic acid, while among the organic acids the most suitable proved to be formic acid, acetic acid, lactic acid, maltic acid, tartaric acid and citric acid.

The achenes of the seeds are preferably utilized in the milled and oil-free condition, if the subsequent extraction is to be carried out with acidified aqueous solutions. In such an instance, the oil is removed with a non-toxic solvent, such as n-hexane or petroleum ether.

In practicing the inventive method of extracting a dyeing substance from the tegument of sunflower seeds, it has been found suitable to carry out the following treatments prior to the extraction step: (a) a preliminary cold treatment of the teguments with water or aqueous solutions of alkali or N/100 alkaline carbonates for time periods varying from ten minutes to two hours, cold, in atmospheres of $N_2$ or $CO_2$, and subsequent acidification of the extract; (b) humidification of the teguments and subsequent chilling thereof at a low temperature ($-10°$ C. to $-15°$ C.); (c) treating the teguments with aqueous solutions of pectolitic enzymes, enzymes of cellulase, hemicellulase and protease, in a buffered environment at 3.0–7.0 pH and for a sufficiently long time. By successive acidification or heating, the enzyme is then blocked and removed.

The extraction process is implemented, according to a preferred but not exclusive embodiment of the invention, by first storing the husks of the achenes in serially connected diffusion tanks; the extracting solution enters in counterflow the tank containing the dye-wise more spent husks and then passes on to the following tanks, saturating with the dyeing substance from the first tank to the last. The temperature is generally the ambient temperature, or marginally higher, (40° C. to 50° C.). In the tanks, a nonoxidizing atmosphere is maintained, e.g. with $CO_2$ or $N_2$. The diffusion process may alternatively be conducted in an individual diffuser, with residence times of 2 to 12 hours. The solution, following filtration, is concentrated under vacuum to a small volume at low temperature (approximately 35° C. to 40° C.) and again filtered to result in a deeply or richly dyed liquid (liquid helianthocyanine).

That liquid may be dried (solid helianthocyanine) either in vacuumed evaporators at a low temperature (30° C. to 40° C.), or after the chilling of the mass and lyophilization thereof, or by spray drying in an air stream at 70° C. to 80° C.

The resulting red powder may then be milled thoroughly. By bringing the pH of the solution to different values with mineral or organic acids, or with alkali, the solution dye thus contained may be fixed onto finely milled different organic or inorganic substances, and the suspension vacuum concentrated until dry or lyophilized. Differently colored powders are thus obtained, which may be milled to an even finer grade.

In order for the instant invention to be better understood, some examples of embodiments thereof are given here below for illustrative, but in no way restrictive, purposes.

EXAMPLE 1

100 grams of sunflower achenes were treated with 1000 ml of ethanol - $H_2O$ (9:1) containing 1% HCl at ambient temperature for 12 to 24 hours under moderate stirring and in a $CO_2$ atmoshpere. Following filtration, the solution has been concentrated under vacuum condition at a temperature not exceeding 40° C., to obtain a richly dyed liquid.

EXAMPLE 2

100 grams teguments were wet with $H_2O$ and left for 1 hour at a temperature of −10° C., and subsequently treated with 1000 $cm^3$ of a 0.05M $SO_2$ aqueous solution. After 24 hour at ambient temperature, the filtered solution was concentrated to one third the volume, brought to 6.8 pH, adsorbed over insoluble finely powdered alumina, and dryed under vacuum. A cinereous violet powder is thus obtained.

EXAMPLE 3

100 grams teguments of sunflower were covered with 1000 $cm^3$ of an acqueous solution of Pectinol for foodstuff applications (polygalacturonase) containing 0.1% enzyme. After 6 hours at a 3.30 pH and a 30° C. temperature, the solution was acidified to 2.00 pH with HCl and additivated with an equal volume of ethanol. After 12 hours at a 25° C. ambient temperature, the solution was filtered, vacuum concentrated, chilled and lyophilized to result in a dark red powder.

In practicing the invention, it will be obvious that operatively equivalent variations and modifications thereof may be introduced by the experts in the art without departing from the true spirit and scope of the invention.

I claim:

1. A method of producing anthocyanin, comprising the steps of treating sunflower seed husks containing anthocyanin at ambient temperature and in a non-oxidizing atmosphere with an acid solution selected from a group consisting of water and an organic or inorganic acid, organic solvent and an organic or inorganic acid, organic solvent and aqueous solution of an organic or inorganic acid, and pure liquid organic acid, then filtering the resulting solution and concentrating the filtrate under vacuum at a temperature between 35° C. to 40° C., to obtain a red colored liquid substance.

2. The method of claim 1, wherein said organic solvent is selected from a group consisting of acetone and alcohols.

3. The method of claim 1, wherein said organic acid is selected from the group consisting of formic acid, acetic acid, lactic acid, malic acid and citric acid.

4. The method of claim 1, wherein said inorganic acid is selected from the group consisting of hydrochloric acid, sulphuric acid, phosphoric acid, sulphurous acid, and carbonic acid.

5. The method of claim 1, wherein said resulting substance is adsorbed, at a predetermined pH, over organic or inorganic finely milled supports, to result in the obtainment of differently colored dried and lyophilized products.

6. The method of claim 1, wherein prior to the treating with an acid solution, the sunflower seed husks are cold treated with water.

7. The method of claim 1, wherein prior to the treating with an acid solution the sunflower seed husks are cold treated with alkali or alkaline carbonates solutions in a $N_2$ or $CO_2$ atmosphere.

8. The method of claim 1, wherein prior to the treating with an acid solution, the husks are wet with water and then chilled at a temperature below 0° C.

9. The method of claim 1, wherein the resulting liquid substance is dried in vacuum evaporators at a temperature lower than 40° C.

* * * * *